US008501864B2

(12) United States Patent
Åkermark et al.

(10) Patent No.: US 8,501,864 B2
(45) Date of Patent: Aug. 6, 2013

(54) INSULATING COMPOSITION FOR AN ELECTRIC POWER CABLE

(75) Inventors: Gustaf Åkermark, Stenungsund (SE); Bernt-Ake Sultan, Stenungsund (SE); Annika Smedberg, Myggenäs (SE)

(73) Assignee: Borealis Technology Oy, Porvoo (FI)

( * ) Notice: Subject to any disclaimer, the term of this patent is extended or adjusted under 35 U.S.C. 154(b) by 663 days.

(21) Appl. No.: 11/629,241

(22) PCT Filed: May 24, 2005

(86) PCT No.: PCT/EP2005/005612
§ 371 (c)(1), (2), (4) Date: Jan. 29, 2008

(87) PCT Pub. No.: WO2005/122185
PCT Pub. Date: Dec. 22, 2005

(65) Prior Publication Data

US 2008/0262136 A1 Oct. 23, 2008

(30) Foreign Application Priority Data

Jun. 11, 2004 (EP) .................................... 04013739

(51) Int. Cl.
*C04B 24/26* (2006.01)

(52) U.S. Cl.
USPC ........... 524/523; 524/556; 524/558; 524/559; 524/560; 524/564

(58) Field of Classification Search
USPC ................. 524/523, 556, 558, 559, 560, 561, 524/562, 563, 564
See application file for complete search history.

(56) References Cited

U.S. PATENT DOCUMENTS

| | | | | |
|---|---|---|---|---|
| 4,399,060 | A * | 8/1983 | Glass | 252/511 |
| 4,812,505 | A | 3/1989 | Topcik | |
| 5,719,218 | A | 2/1998 | Sarma | |
| 6,274,239 | B1 | 8/2001 | Peruzzotti et al. | |
| 6,436,536 | B2 | 8/2002 | Peruzzotti et al. | |
| 2003/0045617 | A1 | 3/2003 | Caronia et al. | |

FOREIGN PATENT DOCUMENTS

| | | | |
|---|---|---|---|
| JP | 01098644 | | 4/1989 |
| JP | 02-045542 | | 2/1990 |
| JP | 02045542 | A * | 2/1990 |
| JP | 02-069542 | | 3/1990 |
| JP | 05-140381 | | 6/1993 |
| JP | 05140381 | A * | 6/1993 |

OTHER PUBLICATIONS

International Search Report corresponding to International Application No. PCT/EP2005/005612.

* cited by examiner

*Primary Examiner* — Peter D Mulcahy
(74) *Attorney, Agent, or Firm* — Fay Sharpe LLP

(57) ABSTRACT

The present invention relates to an insulating composition for an electric power cable which comprises a polyolefin, an antioxidant, and a polar copolymer. Further, the present invention relates to an electric power cable comprising an insulating layer including a composition according to the present invention, and to the use of a polar copolymer for improving the storage stability, i.e. reducing the exudation of an antioxidant, in an insulating polymer composition. Thereby, said composition comprises polar monomer units in a comparatively small amount, e.g. in an amount of polar monomer units in the total polymer part of the composition from 1 to 100 micromol ($1\cdot10^{-6}$ to $100\cdot10^{6}$ mol) per gram of polymer in addition to an antioxidant.

20 Claims, No Drawings

INSULATING COMPOSITION FOR AN ELECTRIC POWER CABLE

The present invention relates to an insulating composition for an electric power cable which comprises a polyolefin, an antioxidant, and a polar copolymer. Further, the present invention relates to an electric power cable comprising an insulating layer including a composition according to the present invention, and to the use of a polar copolymer for improving the storage stability, i.e. reducing the exudation of an antioxidant, in an insulating polymer composition.

Electric power cables for medium voltages (6 to 36 kV), high voltages (36 to 161 kV) and extra high voltages (>161 kV) normally include one or more metal conductors surrounded by an insulating material like a polymer material, such as an ethylene polymer.

In power cables the electric conductor is usually coated first with an inner semi-conducting layer, followed by an insulating layer, then an outer semi-conducting layer, followed by water barrier layers, if any, and on the outside optionally a sheath layer. The layers of the cable are commonly based on different types of ethylene polymers.

The core of a power cable of the above type is normally produced in the following way:

Three layers, one inner semi-conducting layer, one insulating layer, and one outer semi-conducting layer, are extruded onto a conductor using a triple head extruder. In this construction the insulation layer is embedded in between the semi conductive layers like a sandwich. The insulation layer itself is normally one single layer. The extruded core is normally crosslinked.

The thickness of the different layers depend on the electrical stress that the cable is exposed to. Typically, values for the thickness of a MV/HV (medium and high voltage) construction are as follows: the semi-conductive layers are about 0.5 to 2.0 mm each and the insulation layer about 2 to 40 mm.

There are many known methods of producing insulating members for conducting devices.

WO 93/04486 discloses an electrically conductive device having an electrically conductive member comprising at least one electrically insulating member. The insulating member is comprised of an ethylene copolymer, and the copolymer is unimodal as opposed to multimodal.

WO 97/50093 discloses a water tree resistant cable comprising an insulation layer, which further comprises a multimodal copolymer of ethylene, said copolymer having a broad comonomer distribution as measured by TREF. The document does not discuss the problem of premature decomposition.

WO 98/41995 discloses a cable where the conductors are surrounded by an insulation layer comprising a mixture of a metallocene based polyethylene, having a narrow molecular weight distribution and a narrow comonomer distribution.

WO 01/03147 discloses an insulating composition for an electric power cable, which comprises a multimodal ethylene copolymer obtained by coordination catalyzed polymerisation of ethylene, said multimodal ethylene copolymer including an ethylene copolymer fraction selected from a low molecular weight ethylene copolymer and a high molecular weight ethylene copolymer.

A requirement of all the above-mentioned polymers is that they must have long-term stability. Accordingly, it is known in the art to add a stabilizer or a combination of stabilizers to the polymer compositions in order to prolong their lifetime. In particular, stabilizers are added to the polymers to protect them from degradation caused by thermal oxidation, UV-radiation, processing, and by penetration of metal ions, such as copper ions.

It will of course be appreciated that the stabilizer must also be compatible with the polymer composition to which it is added, thereby improving the electrical performance and thus the life length of the cable.

One of the main disadvantages of stabilizers, also known as antioxidants, is that they have a tendency to exude during storage. This can, for example, result in that the product is covered by a dust layer of the antioxidant which is seen as a significant handling problem by users of the product or it can affect the extrusion performance.

To overcome the above problems, the addition of a polar copolymer was proposed. The polar copolymer increases the solubility of the antioxidant, and thereby reduces the amount which is exuded. This has been observed in so-called "copolymer insulating" materials where the level of the polar co-monomer units in the insulation composition is in the range of 200 micromol.

However, the main drawbacks of such formulation is an increase in the electrical losses due to increased tan δ values and an inability to strip specially designed outer semiconductive materials ("strippable screens") from the crosslinked insulation in a clean manner (i.e. no pick-off) without the use of mechanical stripping tools.

These drawbacks have limited the use of this insulation to bonded medium voltage cable constructions.

It is therefore an object of the present invention to provide an insulating polymer composition for an electric power cable comprising an antioxidant (a stabilizer) which does not display the same level of negative properties seen in the prior art, but which, in particular, has an improved exudation behavior, no significant alteration of the electrical losses as measured by tan δ while maintaining strippability.

The present invention is based on the surprising finding that the above object may be achieved by a composition which, in addition to an antioxidant, comprises polar monomer units in a comparatively small amount, e.g. in an amount of polar monomer units in the total polymer part of the composition from 1 to 100 micromol ($1 \cdot 10^{-6}$ to $100 \cdot 10^{-6}$ mol) per gram of polymer.

Accordingly, the present invention provides an insulating polymer composition for an electric power cable comprising (A) a polyolefin and a polymer with polar monomer units, or (B) an olefin copolymer with polar monomer units, and an antioxidant, characterized in that the amount of polar monomer units in the composition is from 1 to 100 micromol per gram of the total amount of polymer in the composition.

It has surprisingly been found that the insulating composition according to the invention shows an improved solubility of the antioxidant in the composition so that reduced exudation of the antioxidant occurs. At the same time, the composition has a sufficiently low adherence to layers of adjacent polymer material so that it can be used for the production of "strippable cable constructions", where a semiconducting layer can be stripped off from an insulating layer formed by the composition. Finally, the composition retains satisfactory electrical properties, such as electrical losses, necessary for its use as insulating material.

Preferably, the composition has a strip force of 5 kN/m or below, more preferably of 4 kN/m or below and still more preferably of 3 kN/m or below.

The strip force is defined to be the force needed to peel off a strippable semi-conductive polymer material as defined below from an insulation layer formed of the insulating composition, and is to be measured on plaque samples as described in detail below.

It is clear, however, that insulating layers formed of the composition according to the invention may also be used in "bonded constructions", i.e. in cable constructions in which semi-conducting layers strongly adhere to the adjacent insulating layer.

The amount of polar monomer units is expressed in micromoles per gram of all polymeric component contained in the composition. Of course, in the composition, the polar monomer units will be incorporated into the backbone of one or more of the polymeric components the composition comprises.

Preferably, the amount of polar monomer units in the composition is 1 micromol or higher, more preferably 5 micromol or higher, and still more preferably 10 micromol or higher per gram of the total amount of polymer in the composition.

Preferably, the amount of polar monomer units in the composition is 100 micromol or lower, more preferably 70 micromol or lower, and still more preferably 40 micromol or lower per gram of the total amount of polymer in the composition.

The polar monomer units may be added to the composition by way of addition of a separate polymer containing these polar monomer units (alternative (A)). However, it is also possible to copolymerise the targeted polar monomer units amount into the polyolefin base resin already during its production (alternative (B)).

The polar polymer in which polar monomer units are incorporated may preferably be an olefin copolymer with one or more types of comonomer units comprising a polar group. More preferably, the polar polymer is a ethylene copolymer with one or more types of comonomer units comprising a polar group.

Preferably, as polar monomer units compounds containing hydroxyl groups, alkoxy groups, carbonyl groups, carboxyl groups, and ester groups are used.

More preferably, compounds containing carboxyl and/or ester groups are used and still more preferably, the compound is selected from the groups of acrylates and acetates.

Still more preferably, the monomers units are selected from the group of alkyl acrylates, alkyl metacrylates, acrylic acids, metacrylic acids and vinyl acetates. Further preferred, the comonomers are selected from $C_1$- to $C_6$-alkyl acrylates, $C_1$- to $C_6$-alkyl metacrylates, acrylic acids, metacrylic acids and vinyl acetate. Still more preferably, the polar copolymer comprises a copolymer of ethylene with $C_1$- to $C_4$-alkyl, such as methyl, ethyl, propyl or butyl acrylates or vinyl acetate.

For example, polar monomer units may be selected from the group of (meth)acrylic acid and alkylesters thereof, such as methyl, ethyl and butyl(meth)acrylate and vinylacetate.

Where the polymer with polar monomer units is a polar ethylene copolymer, the copolymer is preferably an ethylene-acrylate copolymer, still more preferably an ethylene-methyl, -ethyl or -butyl acrylate copolymer or a mixture thereof.

As antioxidant, all types of compounds known for this purpose may be used, such as sterically hindered or semi-hindered phenols, aromatic amines, aliphatic sterically hindered amines, organic phosphates and thio compounds. The antioxidant may also contain ester groups.

Preferably, the antioxidant is selected from the group of sterically hindered or semi-hindered phenols, i.e. phenols which comprise two or one bulky residue(s), respectively, in ortho-position to the hydroxy group, and sulphur containing compounds.

More preferably, the antioxidant is a sterically hindered or semi-hindered phenol which further comprises sulphur.

As antioxidant either a single compound or a mixture of compounds may be used.

It is preferred that the antioxidant is present in the composition in an amount of from 0.05 to 2.0 wt. %.

The polyolefin in the composition preferably is a polyethylene or polypropylene. Where herein it is referred to a "polymer", e.g. polyethylene, this is intended to mean both homo- and copolymer, e.g. ethylene homo- and copolymer.

Where the polyolefin is a polyethylene, the polymer may be produced in a high pressure process resulting in low density polyethylene (LDPE) or in a low pressure process in the presence of a catalyst, for example a chromium, Ziegler-Natta or most preferred single-site catalyst, resulting in either unimodal or multimodal polyethylene.

The expression with regard to the "mode" of the polymer refers to the form of its molecular weight distribution (MWD) curve, i.e. the appearance of the graph of the polymer weight fraction as a function of its molecular weight. If the polymer is produced in a sequential step process, e.g. by utilizing reactors coupled in series in using different conditions in each reactor, the different polymer fractions produced in the different reactors will each have their own molecular weight distribution which may considerably differ from one another. The molecular weight distribution curve of the resulting final polymer can be looked at as the superposition of the molecular weight distribution curves of the polymer fractions which will accordingly show two or more distinct maxima or at least be distinctly broadened compared with the curves for the individual fractions. A polymer showing such a molecular weight distribution curve is called "bimodal" or "multimodal", respectively.

Multimodal polymers can be produced according to several processes which are described, for example, in WO 92/12182.

The multimodal polyethylene preferably is produced in a multi-stage process in a multi-step reaction sequence such as described in WO 92/12182.

In this process, in a first step, ethylene is polymerized in a loop reactor in the liquid phase of an inert low-boiling hydrocarbon medium. Then, the reaction mixture, after polymerisation, is discharged from the loop reactor and at least a substantial part of the inert hydrocarbon is separated from the polymer. The polymer is then transferred in a second or further step to one or more gasphase reactors where the polymerisation is continued in the presence of gaseous ethylene. The multimodal polymer produced according to this process has a superior homogeneity with respect to the distribution of the different polymer fractions which cannot be obtained, for example, by a polymer mix.

The catalyst for the production of the ethylene polymer comprises a single-site catalyst, such as, for example, a metallocene catalyst. Preferred single-site catalysts are described in EP 0688794, EP 0949274, WO 95/12622, WO 00/34341 and WO 00/40620. Most preferred is the catalyst as described in WO 95/12622 and its preferred embodiments as described in the document.

The multimodal polyethylene comprises a low molecular weight (LMW) ethylene homo- or copolymer fraction and a high molecular weight (HMW) ethylene homo- or copolymer fraction.

Depending on whether the multimodal ethylene polymer is bimodal or has a higher modality, the LMW and/or HMW fraction may comprise only one fraction each or two or more subfractions.

Preferably, the ethylene polymer is a bimodal polymer, and consists of one LMW fraction and one HMW fraction.

It is further preferred that the ethylene polymer comprise an ethylene polymer fraction selected from:

a) a LMW ethylene polymer having a density of 0.860 to 0.970 g/cm$^3$, more preferably from about 0.900 to 0.950 g/cm$^3$, and an $MFR_2$ of 0.1 to 5000 g/10 min, more preferably of 25 to 500 g/10 min b) a HMW polymer having a density of 0.870 to 0.945 g/cm$^3$, more preferably of 0.870 to 0.940 g/cm$^3$ and an $MFR_2$ of 0.01 to 10.0 g/10 min, more preferably of 0.1 to 3 g/10 min.

Thus, the high molecular weight ethylene polymer is linear with low density type polyethylene (LLDPE).

Preferably, the ethylene polymer comprises both fractions (a) and (b).

Preferably, at least one fraction of the ethylene polymer is a copolymer which was polymerized with an alpha-olefin, preferably a $C_3$-$C_8$ alpha-olefin, preferably with at least one comonomer selected from the group consisting of propylene, 1-butene, 4-methyl-1-pentene, 1-hexene and 1-octene. Preferably, the amount of comonomer is the ethylene product is 0.02 to 5.0 mol %, more preferably 0.05 to 2.0 mol %.

Preferably, the HMW fraction is an ethylene copolymer, preferably copolymerised with one of the above-disclosed comonomers, and more preferably, both HMW and LMW fractions are ethylene copolymers, preferably copolymerised with one of the above-disclosed comonomers.

Usually, a first copolymer fraction of high melt flow rate and with addition of comonomer is produced in the first reactor, whereas a second ethylene copolymer fraction with low melt flow rate is produced in the second reactor.

The properties of the multimodal polyethylene may be adjusted by altering the ratios of the low molecular weight fraction and the high molecular weight fraction in the multimodal polyethylene.

In the multimodal ethylene copolymer of the invention the LMW ethylene copolymer fraction preferably comprises 30 to 60% by weight of the multimodal ethylene copolymer, and, correspondingly, the HMW ethylene copolymer fraction comprises 70 to 40% by weight.

Preferably, the multimodal polyethylene has a density of 0.890 to 0.940 g/cm$^3$.

Further preferred, the polyethylene has a $MFR_2$ of 0.1 to 10 g/10 min.

Still further preferred, the polyethylene has a molecular weight distribution MWD of 3.5 to 20, and more preferred 4 to 15, and most preferred 4 to 12.

Further preferred, the polyethylene has a melting point of below 125° C.

Still further preferred, the polyethylene has a comonomer distribution as characterized by temperature rising elution function (TREF) such that the fraction of polymer eluted at a temperature of higher than 90° C. does not exceed 10 wt. %.

The production of a multimodal polyethylene is preferably carried out in a multistage process in which the polymerisation is carried out in two or more polymerisation reactors connected in series.

However, alternatively multimodal polymer may be produced through polymerisation in a single reactor with the aid of a dual site coordination catalyst or a blend of different coordination catalysts. The dual site catalyst may comprise two or more different single site metallocene species each of which produces a narrow molecular weight distribution and a narrow comonomer distribution.

Where the polyolefin of the composition comprises polypropylene, this may be a unimodal or multimodal propylene homo- or copolymer and/or a heterophasic polypropylene.

It is preferred that the polyolefin of the composition comprises a high pressure polyethylene (HPPE) which has been produced by a high pressure process using free radical polymerization. The polymerization generally is preformed at pressures of 120 to 350 MPa and at temperatures of 150 to 350° C.

The HPPE may be an ethylene homopolymer or a copolymer of ethylene with a non-polar alpha-olefin. Such alpha-olefins may also comprise further unsaturation such as e.g. in alpha-omega dienes. Preferably, $C_3$ to $C_{10}$ alpha-olefins without further unsaturation are used as comonomers, such as propylene, 1-butene, 1-hexene, 4-methyl-1-pentene and 1-octene, 1-nonene and/or $C_8$ to $C_{14}$ non-conjugated dienes, such as 1,7-octadiene and/or 1,9-decadiene and mixtures thereof.

If the HPPE is a copolymer, it is preferred that it includes 0 to 25 wt.-%, more preferably 0.1 to 15 wt.-% of one or more comonomers.

Preferably, the composition according to the invention is crosslinkable. This may be achieved e.g. by further including a crosslinking agent into the composition or by the incorporation of crosslinkable groups into the polyolefin of the composition.

Preferably, the composition further comprises a peroxide as a crosslinking agent.

Further preferred, the crosslinking agent is present in the composition in an amount of from 0.1 to 5% by weight, more preferred from 0.4 to 3% by weight.

The composition may in addition to the additives already mentioned contain further additives such as processing aids, e.g. scorch retardants and crosslinking boosters. Also additives preventing/retarding water treeing and electrical treeing can be present.

The total amount of additives will preferably be from 0.2 to 5 wt.-%, more preferably from 0.3 to 4 wt.-% of the total composition.

The present invention also provides an electric power cable comprising a layer including an insulating composition as described herein.

It is an advantage of the present invention that the insulating composition allows for the production of strippable insulating layers, i.e. insulating layers which may be stripped off from an adjacent semi-conductive layer. However, this strippability also depends on the kind of semi-conductive layer used so that in case a "non-strippable" semi-conductive layer is used this may lead to a "bonded" cable construction.

Electrical cables and particularly electric power cables for medium and high voltages may be composed of several polymer layers extruded around an electric conductor. In power cables the electrical conductor is usually first coated with an inner semi-conductive layer followed by an insulation layer, then an outer semi-conductive layer. These layers are usually crosslinked. These three layers are followed by water barrier layers, if any, and on the outside optionally a sheath layer.

The present invention also pertains to the use of (A) a polymer with polar monomer units, or (B) an olefin copolymer with polar monomer units, in an insulating polymer composition comprising an antioxidant such that the amount of polar monomer units is from 1 to 100 micromol per gram of the total polymeric part of the composition for reducing the exudation of the antioxidant.

An insulating polymer composition in accordance with the present invention will now be described by way of example.

EXAMPLES

Three polymer compositions according to the invention with corresponding comparative samples were produced. For all the compositions a radical initiated high pressure ethylene polymer (LDPE of density 922 kg/m$^3$ and $MFR_2$ of 2 g/10 min) was used as the ethylene base resin.

To this base resin different additives were added for the different polymer compositions. The following formulations were prepared, see Table 1.

TABLE 1

| Formu-lation | Antioxidant type | Antiox. content (wt. %) | Peroxide (%) | Polar Copolymer type | Polar copolymer content in wt. % | Amount of polar monomer units in micromol per gram of the total amount of polymer in the composition |
|---|---|---|---|---|---|---|
| 1 | Stabiliser 1 | 0.2 | 2 | poly (ethylene butyl acrylate) | 1.0 | 13 = 1.3% |
| 2 | Stabiliser 1 | 0.2 | 2 | poly (ethylene butyl acrylate) | 3.0 | 40 |
| 3 Comp. | Stabiliser 1 | 0.2 | 2 | — | —/— | |
| 4 | Stabiliser 2/3 | 0.2/0.2 | 1.7 | poly (ethylene ethyl acrylate) | 1.8 | 27 |
| 5 Comp. | Stabiliser 2/3 | 0.2/0.2 | 1.7 | — | —/— | |
| 6 Comp. | Stabiliser 1 | 0.25 | 2 | poly (ethylene butyl acrylate) | 18.8 | 246 = 2.5% |

Stabiliser 1: 4,4'-thio-bis-(2-tert.-butyl-5-methylphenol) [96-69-5],

Stabiliser 2: 2,2'-thio-diethyl-bis-(3-(3,5-di-tert.-butyl-4-hydroxyphenyl)-propionate) [41484-35-9].

Stabiliser 3: Distearyl 3,3'-thiodipropionate [693-36-7]

The polar copolymers used were poly(ethylene-co-butylacrylate) and poly(ethylene-co-ethylacrylate) with an acrylate content of 17 wt. % and 15 wt. %, respectively.

A) Measurement Methods a) Melt Flow Rate MFR was measured in accordance with ISO 1133. $MFR_2$ was measured under a load of 2.16 kg at 190° C.

b) Molecular Weight Distribution MWD was measured using Gel Permeation Chromatography.

c) TREF was measured according to L. Wild, T. R. Ryle, D. C Knobeloch, and I. R. Peak, Journal of Polymer Science, Polymer Physics Ed., vol. 20, pp. 441-445 (1982).

B) Strip Force Measurements and Results

The strip force is to be determined on plaque samples in the following way:

One plaque, prepared from extruded tapes, of the insulation material (e.g. according to formulation 1 to 6) with a thickness of 2 to 4 mm and one plaque, prepared from extruded tapes, of a strippable semiconductive material (0.8 mm thick) are pressed separately at a low temperature, 120° C., for 3 to 5 min at 100 bar, and then cooled to room temperature.

The composition of the strippable semiconductive material to be used could be prepared as described in EP 420 271 B1. Typically, it is based on:

48 wt. % of a low density ethylene vinyl acetate copolymer with 33 wt. % vinyl acetate monomer units 10 wt. % of a copolymer of acrylonitrile and butadiene 41 wt. % of carbon black of N 550 type (ASTM D 1765-91)

1 wt. % of peroxide.

Then, a "composite plaque" is prepared by pressing the plaque of the insulation material and the plaque consisting of the strippable semiconductive layer together in a press at 180° C. First, they are pressed together during 1 min at low pressure and then they are crosslinked together at 200 bar for 30 min followed by cooling down to room temperature at a cooling rate of 15° C./min.

From this composite plaque, a rectangular sample is taken out and conditioned for 16 h at ambient temperature and at a controlled humidity. The strippable semi-conductive material was then removed, at a 90° angle, from the insulation in a tensile testing device using a load of 1 kN and a draw speed of 500 mm/min. The strip force (kN/m) is defined as the measured force in Newton divided by the width of the specimen.

The following strip forces were measured (average values from 10 measurements each):

Formulation 1: 1.3 kN/m

Formulation 2: 1.9 kN/m

Formulation 3 (Comparative): 1.52 kN/m

Formulation 4: 1.37 kN/m

Formulation 5 (Comparative): 0.72 kN/m

Formulation 6 (Comparative): >>5 kN/m (not strippable)

The results indicate that the strip force for the formulations according to the invention is on the same level as that for the comparative formulations and, thus, that strippable cable constructions can be produced by using the insulating composition according to the invention.

C) Antioxidant Contents on the Pellet Surface (Exudation)

One way of measuring the solubility of an antioxidant/antioxidant system is to measure the amount that migrates to the surface, i.e. exudes. The amount of exuded antioxidant on the surface of the pellets gives an indication of the solubility of the antioxidant in the polymer matrix. In this test the pellets are "washed" under moderate agitation in a solvent (methanol) (100 g pellets in 100 ml methanol) for 5 minutes and afterwards the concentration of the antioxidant in the solution is determined by a HPLC analysis. This is a commonly used test in the cable industry.

The pellets were stored at 35° C. and the results after 8 months of storage for the Formulation 1-3 are that following:

| Sample: | AO |
|---|---|
| Formulation 1 | 615 ppm |
| Formulation 2 | <10 ppm |
| Formulation 3 (Comp.) | 1014 ppm |

Pellets were also stored at 35° C. of Formulation 4 and 5 and the results after 4.5 months are the following:

| Sample | AO |
|---|---|
| Formulation 4 | 600 ppm |

-continued

| Sample | AO |
|---|---|
| Formulation 5 (Comp.) | 890 ppm |
| Formulation 6 | <10 ppm (9 months) |

D) Electrical Testing

Another parameter that might be affected by the addition of the polar component is the electrical losses in the material.

For this test samples were prepared and evaluated in the following way: Pellets of formulation 1 to 3 were prepared by crosslinking a plaque at 200° C. for 10 min of the materials. Then the dissipation factor (tan δ) and the relative permittivity ($\epsilon_r$) were determined at 50 Hz and at two temperatures, 23° and 130° C. Measurements were performed both directly after crosslinking. The results are presented in Table 2.

TABLE 2

| Sample | Tan δ (23° C.) | Tan δ (130° C.) | $\epsilon_r$ (23° C.) | $\epsilon_r$ (130° C.) |
|---|---|---|---|---|
| Formulation 1 | 0.00025 | 0.00003 | 2.32 | 1.88 |
| Formulation 2 | 0.00026 | 0.00002 | 2.35 | 1.89 |
| Formulation 3 (Comp.) | 0.00023 | 0.00003 | 2.32 | 1.87 |
| Formulation 6 (Comp.) | 0.00046 | 0.00019 | 2.4 | 2.14 |

The invention claimed is:

1. An insulating polymer composition for an electric power cable comprising:

(A) a low density polyethylene polymer and a polymer with polar monomer units, or (B) a copolymer of propylene and a polar monomer unit or a multimodal copolymer of ethylene and a polar monomer unit, and an antioxidant, characterized in that the amount of polar monomer units in the composition is from 1 to 40 micromol per gram of the total amount of polymer in the composition.

2. Insulating composition according to claim 1 wherein the composition has a strip force of 5 kN/m or below.

3. Insulating composition according to claim 1 wherein the amount of polar monomer units in the composition is from 5 to 40 micromol per gram of the total amount of polymer in the composition.

4. Insulating composition according to claim 3, wherein the amount of polar monomer units in the composition is from 10 to 40 micromol per gram of the total amount of polymer in the composition.

5. Insulating composition according to claim 1 wherein the polymer with polar monomer units in (A) is an olefin copolymer with polar monomer units.

6. Insulating composition according to claim 1 wherein the polar monomer units are selected from the group of acrylates and methacrylates.

7. Insulating composition according to claim 6 wherein the polar monomer units are selected from the group of methylacrylate, ethylacrylate, butylacrylate, and vinylacetate.

8. Insulating polymer composition according to claim 1 wherein the antioxidant is a hindered antioxidant, a semihindered phenolic antioxidant, or a sulfur containing antioxidant.

9. Insulating polymer composition according to claim 1 wherein the antioxidant is present in an amount of from 0.05 to 2 wt.-%.

10. Insulating composition according to claim 1, wherein the low density polyethylene polymer has been produced in a high pressure process.

11. An electric power cable comprising a layer including an insulating composition according to claim 1.

12. An electric power cable according to claim 11 which further comprises an inner semiconducting layer and an outer semiconducting layer adjacent to the insulating layer.

13. Insulating composition according to claim 2 wherein the amount of polar monomer units in the composition is from 5 to 40 micromol per gram of the total amount of polymer in the composition.

14. Insulating composition according to claim 2 wherein the polymer with polar monomer units in (A) is an olefin copolymer with polar monomer units.

15. Insulating composition according to claim 3 wherein the polymer with polar monomer units in (A) is an olefin copolymer with polar monomer units.

16. Insulating composition according to claim 4 wherein the polymer with polar monomer units in (A) is an olefin copolymer with polar monomer units.

17. Insulating composition according to claim 2 wherein the polar monomer units are selected from the group of acrylates and methacrylates.

18. Insulating polymer composition according to claim 2 wherein the antioxidant is a hindered antioxidant, a semihindered phenolic antioxidant, or a sulfur containing antioxidant.

19. An insulating polymer composition for an electric power cable comprising:

(A) a polyethylene polymer having a density of from 0.922 to 0.970 $g/cm^3$ and a polymer with polar monomer units, or (B) a copolymer of propylene and a polar monomer unit or a multimodal copolymer of ethylene and a polar monomer unit, and an antioxidant, characterized in that the amount of polar monomer units in the composition is from 1 to 40 micromol per gram of the total amount of polymer in the composition.

20. An insulating polymer composition for an electric power cable comprising:

(B) a copolymer of propylene and a polar monomer unit or a multimodal copolymer of ethylene and a polar monomer unit, and an antioxidant, characterized in that the amount of polar monomer units in the composition is from 1 to 40 micromol per gram of the total amount of polymer in the composition.

* * * * *

UNITED STATES PATENT AND TRADEMARK OFFICE

CERTIFICATE OF CORRECTION

PATENT NO. : 8,501,864 B2
APPLICATION NO. : 11/629241
DATED : August 6, 2013
INVENTOR(S) : \Akermark et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1137 days.

Signed and Sealed this
Fifteenth Day of September, 2015

Michelle K. Lee
*Director of the United States Patent and Trademark Office*